United States Patent Office 3,360,567
Patented Dec. 26, 1967

3,360,567
CATALYTIC DEHYDROGENATION OF ALCOHOLS
Fred L. Johnson, Jr., Austin, Tex., assignor to Jefferson Chemical Company, Inc., Houston, Tex., a corporation of Delaware
No Drawing. Filed Oct. 31, 1963, Ser. No. 320,560
6 Claims. (Cl. 260—594)

ABSTRACT OF THE DISCLOSURE

Aliphatic hydrocarbon 1,2-glycols of the formula $$RCH(OH)CH_2OH$$

wherein R represents phenyl or an alkane hydrocarbon group containing 1 to 16 carbon atoms can be catalytically dehydrogenated to the corresponding keto alcohol in the presence of a catalyst prepared by the hydrogen reduction of a mixture of 5 to 50 wt. percent of copper oxide and 2 to 25 wt. percent of chromium oxide and, correspondingly, from 93 to 25 wt. percent of zinc oxide.

---

This invention relates to a method for the production of keto alcohols. More particularly, this invention is directed to a method for the production of keto alcohols by dehydrogenation of corresponding 1,2-glycols.

It has heretofore been proposed to prepare keto alcohols, such as acetol, by the catalytic dehydrogenation of glycols, such as propylene glycol. However, catalytic dehydrogenation has not been particularly suitable for this purpose because of the poor selectivity of the glycol to the corresponding keto alcohol or poor conversion of the glycol feed stock, or both.

In complete contradistinction to prior results, it has been discovered in accordance with the present invention that keto alcohols can be prepared from 1,2-aliphatic hydrocarbon glycols by catalytically dehydrogenating a glycol in the presence of a catalyst prepared by the hydrogen reduction of a mixture of 5 to 50 wt. percent of copper oxide and 2 to 25 wt. percent of chromium oxide with, correspondingly, from 93 to 25 wt. percent of zinc oxide.

The feed stocks for the present invention are hydrocarbon 1,2-glycols containing at least three carbon atoms of the formula $RCH(OH)CH_2OH$ wherein R represents a hydrocarbon group containing 1 to 16 carbon atoms, such as methyl, ethyl, propyl, butyl, hexyl, decyl, dodecyl, tetradecyl, hexadecyl, aryl etc. and such as 1,2-propylene glycol, 1,2-butylene glycol, 1,2-dodecylene glycol, phenylethylene glycol, etc.

The dehydrogenation catalyst to be employed in accordance with the present invention contains copper, zinc, and chromium, and is used after having been treated with hydrogen. Mixtures of oxides which may be used in accordance with the present invention are mixtures containing 5 to 50 wt. percent of copper oxide and 2 to 25 wt. percent of chromium oxide with, correspondingly, 93 to 25 wt. percent of the zinc oxide.

The reduction, accomplished in the presence of hydrogen, may be conducted at a temperature within the range of 300° to 500° C. by passing a stream of a hydrogen-containing gas such as a mixture of 2 to 10 mol percent of hydrogen with, correspondingly, 98 to 90 mol percent of nitrogen over the catalyst for a period of time within the range of 2 to 24 hours sufficient to substantially reduce the copper oxide to metallic copper. Under these conditions, the more difficultly reducible chromium oxide will remain in the oxide form.

The dehydrogenation reaction of the present invention is suitably conducted in the vapor phase at a temperature within the range of about 200° to 450° C., such as a temperature within the range of 250° to 375° C. The reaction is preferably conducted at about atmospheric pressure although subatmospheric or superatmospheric pressures may be used if desired. The space velocity of the glycol feed stock may suitably be within the range of about 0.5 to about 10 pounds of glycol feed stock per pound of catalyst per hour, and more preferably within the range from about 1 to about 5 pounds of glycol feed stock per pound of catalyst per hour.

The present invention will be further illustrated by the following specific examples, which are given by way of illustration and not as limitations on the scope of this invention.

*Example I*

In order to demonstrate the superior results obtainable in accordance with the present invention, the results obtained in a number of experiments with various catalysts are presented. The feed stock for the experiments was propylene glycol, and each experiment was performed by passing propylene glycol over a fixed bed of a particular dehydrogenation catalyst at a temperature within the range of about 250° to 450° C.

The catalysts that were tested, the reaction condiions employed and the results obtained are set forth in the following table.

The copper-chromium-zinc catalyst employed in the experiment was prepared by passing a gas composed of 10% hydrogen and 90% nitrogen over a mixture of oxides initially containing 11 wt. percent copper oxide, 22 wt. percent chromium oxide and 60 wt. percent of zinc oxide at a temperature of 380° C. for 4 hours.

TABLE I.—CATALYST SCREENING STUDIES

| Catalyst | Temp., °C. | WHSV (g. PG per cc. cat./hr.) | Phase | Reactor pressure (p.s.i.g.) | Gas feed and flow (l./min.) | VPC Analysis, Area percent | | |
|---|---|---|---|---|---|---|---|---|
| | | | | | | Lights | Acetol | PG |
| Ni-ZnO (mol ratio Ni:Zn=1:2.7) coated on alundum | 242 | 0.96 | Liquid | 102 | $N_2$-1 | 1.4 | 5.6 | 90 |
| Ni-ZnO (1:2.7) | 464 | 0.82 | Vapor | 93 | $N_2$-3 $H_2$-0.13 | 13 | 30 | 57 |
| Ni-ZnO (mol ratio Ni:Zn=1:1.37) coated on alundum | 258 | 0.50 | Liquid | 103 | $N_2$-0.38 $H_2$-trace | 24 | 19 | 48 |
| Ni-ZnO (1:1.37) | 460 | 1.1 | Vapor | 102 | $N_2$-0.8 $H_2$-0.05 | 40 | 26 | 34 |
| Ni-ZnO on activated carbon (~5% Ni and 10% Zn) | 314 | 0.45 | do | Atm. | $N_2$-0 $H_2$-trace | 23 | 15 | 62 |
| Ag on $Al_2O_3$ (~15% Ag) | 287 | 1.35 | do | Atm. | $N_2$-0.3 $H_2$-0 | 60 | 16 | 24 |
| Ag on $Al_2O_3$ (oxidative dehydrogenation) (~15% Ag) | 317 | 1.35 | do | Atm. | $N_2$-0 $H_2$-0 Air-0.6 | 63 | 21 | 16 |
| Ag on activated carbon (oxidative dehydrogenation) (~25% Ag) | 253 | 0.3 | do | Atm. | $N_2$-0.7 $H_2$-0 Air-0.5 | 28 | 10 | 62 |
| Cu on $Al_2O_3$ (20% Cu) | 280 | 1.0 | do | Atm. | $N_2$-2 $H_2$-0 Air-0 | 9 | 50 | 18 |
| Cu on $Al_2O_3$ (oxidative dehydrogenation) (20% Cu) | 282 | 1.0 | do | Atm. | $N_2$-1.3 Air-0.2 | 5 | 13 | 82 |
| CuO, $Cr_2O_3$, ZnO (Cu, 9%; Zn, 48%; Cr, 15%) | 304 | 1.1 | do | Atm. | $N_2$-0.5 $H_2$-0.1 | 1 | 76 | 23 |

As can be seen from the foregoing table, excellent results were obtained with the dehydrogenation catalyst of the present invention in that there was only a very minor production of light byproducts and in that substantially the only product that was obtained was acetol, the desired keto alcohol. On a percentage basis, the results correspond to a 77% conversion of propylene glycol with about a 96% yield of acetol. As will be seen from the table, with the other catalysts, conversion was either poor or yield was low or both.

*Example II*

Not only does the catalytic conversion of the present invention result in a highly selective production of keto alcohols, but there is also long catalyst life. This is illustrated by the following continuous runs which were conducted utilizing the catalyst of Example I in the form of 4 by 16 mesh catalyst particles. The results of the three representative long-term runs are set forth in the following table:

TABLE II.—CATALYST ACTIVITY DURING LONG CONTINUOUS RUNS

| Cat. temp., °C. | VPC Analysis, Area Percent ||| Run, hrs. |
| | Lights | Acetol | Propylene glycol | |
|---|---|---|---|---|
| Begin | 292 | 1.2 | 66 | 33 | 103 |
| End | *303 | *0.6 | *68 | *31 | |
| Begin | 312 | 2.5 | 57 | 41 | 175 |
| End | 329 | 2.5 | 45 | 53 | |
| Begin | 248 | <1 | 31 | 69 | 197 |
| End | 321 | 1 | 44 | 55 | |

*Sample taken after only 48 hours operation.

*Example III*

Example III is an example of the effect of temperature upon yield and selectivity. A number of runs were employed wherein propylene glycol was converted to acetol utilizing the catalyst in Example I. The reaction conditions employed and the results obtained are set forth in the following table:

TABLE III.—YIELDS AND CONVERSIONS VS. CATALYST TEMPERATURE

| Cat. temp., °C. | Weight Percent || Percent Yield | Percent Conversion | Gas Feed |
| | Acetol | Propylene Glyxol | | | |
|---|---|---|---|---|---|
| 247–261 | 30.5 | 65.1 | 89 | 35 | None. |
| 247–248 | 25.0 | 72.3 | 88 | 28.5 | $H_2$, 40 ml./min. |
| 265 | 36.4 | 61.4 | 92 | 36.5 | $H_2$, 40 ml./min. |
| 307–308 | 55.0 | 36.1 | 83 | 65 | $H_2$, 40 ml./min. |
| 324–328 | 55.6 | 35.8 | 84 | 65 | $H_2$, 40 ml./min. |
| 364–368 | 52.5 | 29.7 | 72 | 71 | $H_2$, 40 ml./min. |

As can be seen from the foregoing table, it is preferable to utilize a temperature within the range of about 300° to about 350° C. for the best results.

*Example IV*

As has been indicated, it is necessary to the practice of the present invention to use a hydrogen pre-reduced catalyst. This is shown by the followinng example.

A mixture of oxides of Example I, without prior reduction, was utilized as a catalyst for the production of acetol from propylene glycol. In this situation, reduction was attempted in situ.

The catalyst was heated to a temperature of about 320° under an atmosphere of nitrogen and then nitrogen containing propylene glycol was passed over the catalyst. The propylene glycol concentration was about 50%. Within about ten minutes, the catalyst temperature rose from 320° to about 520° C. and then began to decrease slowly, and after about two hours was again at a temperature of about 320° C. The percentage of acetol in the effluent gas was not calculated, but was too low to be readily measured. Attempted regeneration of the catalyst with air followed by slow reduction with propylene glycol (propylene glycol concentration about 1.5%) so as to avoid excessive temperature also failed to bring about a suitable activation of the catalyst. After the slow reduction of the catalyst with propylene glycol, as mentioned, the acetol content of the crude effluent rose to 36%. However, after only 12 hours the acetol concentration had dropped to 21%.

*Example V*

As another example of the present invention, 1,2-butylene glycol vapors were passed over the catalyst of Example I at a temperature within the range of 335° to 345° C. The product, hydroxymethylethyl ketone, was obtained in 77% yield at about a 74% conversion of the 1,2-butylene glycol.

Having thus described my invention, what is claimed is:

1. A method for the production of a keto alcohol which comprises the steps of contacting in the vapor phase a 1,2-glycol of the formula $$RCHOHCH_2OH$$

wherein R is selected from the group consisting of phenyl and an alkane hydrocarbon group containing 1 to 16 carbon atoms with a copper, zinc, chromium oxide catalyst at a temperature within the range of about 200° to about 450° C. and recovering a keto alcohol corresponding to the 1,2-glycol feed stock from the products of the reaction, said catalyst having been prepared by the hydrogen reduction of a mixture of copper, zinc and chromium oxides containing from about 5 to 50 wt. percent of copper oxide, from about 2 to about 25 wt. percent of chromium oxide and, correspondingly, about 93 to about 25 wt. percent of zinc oxide.

2. A method for the production of a keto alcohol which comprises the steps of contacting in the vapor phase a 1,2-glycol of the formula $$RCHOHCH_2OH$$

wherein R is selected from the group consisting of phenyl and an alkane hydrocarbon group containing 1 to 16 carbon atoms with a catalyst at a temperature within the range of about 200° to about 450° C. and recovering a keto alcohol corresponding to the glycol feed stock from the products of the reaction, said catalyst having been prepared by the hydrogen reduction at a temperature of about 300° to 500° C. of a mixture of copper, zinc and chromium oxides containing 5 to 50 wt. percent of copper oxide, 2 to 25 wt. percent of chromium oxide and, correspondingly, about 93 to 25 wt. percent of zinc oxide.

3. A method as in claim 2 wherein the glycol is propylene glycol.

4. A method as in claim 2 wherein the glycol is 1,2-butylene glycol.

5. A method for preparing acetol which comprises contacting propylene glycol in vapor phase with a catalyst at a temperature of 200° to 400° C., said catalyst having been prepared by the hydrogen reduction at a temperature within the range from about 300° to about 500° C. of a mixture of oxides containing from about 5 to about 50 wt. percent of copper oxide, about 2 to about 25 wt. percent of chromium oxide and, correspondingly, about 93 to about 25 wt. percent of zinc oxide.

6. A method as in claim 5 wherein the conversion is conducted at a temperature within the range from about 250° to about 375° C.

References Cited

UNITED STATES PATENTS

| | | | |
|---|---|---|---|
| 2,143,383 | 1/1939 | McNamee et al. | 260—594 |
| 2,218,457 | 10/1940 | Winans | 260—596 |

LEON ZITVER, *Primary Examiner.*

M. JACOB, *Assistant Examiner.*